(12) United States Patent
Evans et al.

(10) Patent No.: US 10,890,954 B2
(45) Date of Patent: Jan. 12, 2021

(54) COMPUTING DEVICES WITH FORMED EDGES AND METHODS OF MANUFACTURING THEREOF

(71) Applicant: Microsoft Technology Licensing, LLC, Redmond, WA (US)

(72) Inventors: Ryan Travis Evans, Bellevue, WA (US); John Charles Meyer, Redmond, WA (US); Jason Edward Tripard, Mercer Island, WA (US); Matthew Thomas Condon, Seattle, WA (US); Ian Howe Lewis, Kenmore, WA (US); Bernard Maurice Schultz, III, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/691,475

(22) Filed: Aug. 30, 2017

(65) Prior Publication Data

US 2018/0314303 A1    Nov. 1, 2018

Related U.S. Application Data

(60) Provisional application No. 62/492,528, filed on May 1, 2017.

(51) Int. Cl.
*G06F 1/16* (2006.01)
*G06F 1/18* (2006.01)
*B23K 26/38* (2014.01)

(52) U.S. Cl.
CPC .............. *G06F 1/181* (2013.01); *B23K 26/38* (2013.01); *G06F 1/1601* (2013.01);
(Continued)

(58) Field of Classification Search
None
See application file for complete search history.

(56) References Cited

U.S. PATENT DOCUMENTS

| | | | |
|---|---|---|---|
| 6,278,079 B1 | 8/2001 | McIntyre et al. | |
| 6,777,055 B2 | 8/2004 | Janssen et al. | |

(Continued)

FOREIGN PATENT DOCUMENTS

| | | | |
|---|---|---|---|
| CN | 201560345 U | 8/2010 | |
| CN | 106056563 A | 10/2016 | |

OTHER PUBLICATIONS

Krumsee, Art, "Laser Cutting an Enclosure to Compare to 3D Printing and Milling", http://makezine.com/2017/03/01/laser-cutting-enclosure-compare-3d-printing-milling/, Published on: Mar. 1, 2017, 12 pages.

(Continued)

*Primary Examiner* — Anthony Q Edwards
*Assistant Examiner* — Rashen E Morrison
(74) *Attorney, Agent, or Firm* — Ray Quinney & Nebeker P.C.; Paul N. Taylor

(57) ABSTRACT

A computing device includes a support structure with at least one edge. The computing device includes a cover connected to the support structure. The cover extends to or beyond the at least one edge of the support structure by no more than between 0 and 100 microns over an edge length of at least 100 mm. A fabric cover includes a cover edge and a cover surface. The cover edge and/or the cover surface include an edge feature. A method of manufacturing a computing device is described. The method includes determining an edge of a computing device and based on the edge that was determined, cutting the fabric cover between 0 and 100 microns of the edge of the computing device over an edge length of the computing device of at least 100 mm.

20 Claims, 8 Drawing Sheets

(52) U.S. Cl.
CPC .......... *G06F 1/1613* (2013.01); *G06F 1/1616* (2013.01); *G06F 1/1626* (2013.01)

(56) References Cited

U.S. PATENT DOCUMENTS

| | | | | |
|---|---|---|---|---|
| 6,977,818 B1* | 12/2005 | Depew | ................. | H01L 23/433 |
| | | | | 361/719 |
| 8,424,829 B2* | 4/2013 | Lu | ......................... | A45C 11/00 |
| | | | | 248/371 |
| 8,498,100 B1* | 7/2013 | Whitt, III | .............. | G06F 1/1618 |
| | | | | 361/679.17 |
| 8,544,639 B2* | 10/2013 | Yang | ...................... | A45C 11/00 |
| | | | | 206/45.2 |
| 9,474,345 B2* | 10/2016 | Smith | .................... | A45C 11/00 |
| 2006/0019073 A1* | 1/2006 | Kinley | ..................... | B32B 7/06 |
| | | | | 428/195.1 |
| 2008/0206710 A1 | 8/2008 | Kruth et al. | | |
| 2011/0075356 A1* | 3/2011 | Tanaka | ................. | G06F 1/1616 |
| | | | | 361/679.55 |
| 2011/0147347 A1 | 6/2011 | Maurer | | |
| 2012/0068798 A1* | 3/2012 | Lauder | ................. | G06F 1/1613 |
| | | | | 335/306 |
| 2013/0003284 A1* | 1/2013 | Massaro | ................. | G06F 1/166 |
| | | | | 361/679.28 |
| 2014/0071606 A1* | 3/2014 | Bates | .................... | G06F 1/1669 |
| | | | | 361/679.09 |
| 2015/0346780 A1 | 12/2015 | Leon et al. | | |
| 2016/0074937 A1 | 3/2016 | Nassar et al. | | |
| 2018/0314293 A1* | 11/2018 | Evans | ................. | G06F 1/1626 |
| 2019/0101787 A1* | 4/2019 | Inoue | ................ | G02F 1/133308 |

OTHER PUBLICATIONS

"International Search Report and Written Opinion Issued in PCT Application No. PCT/US18/028461", dated Jul. 11, 2018, 11 Pages.

* cited by examiner

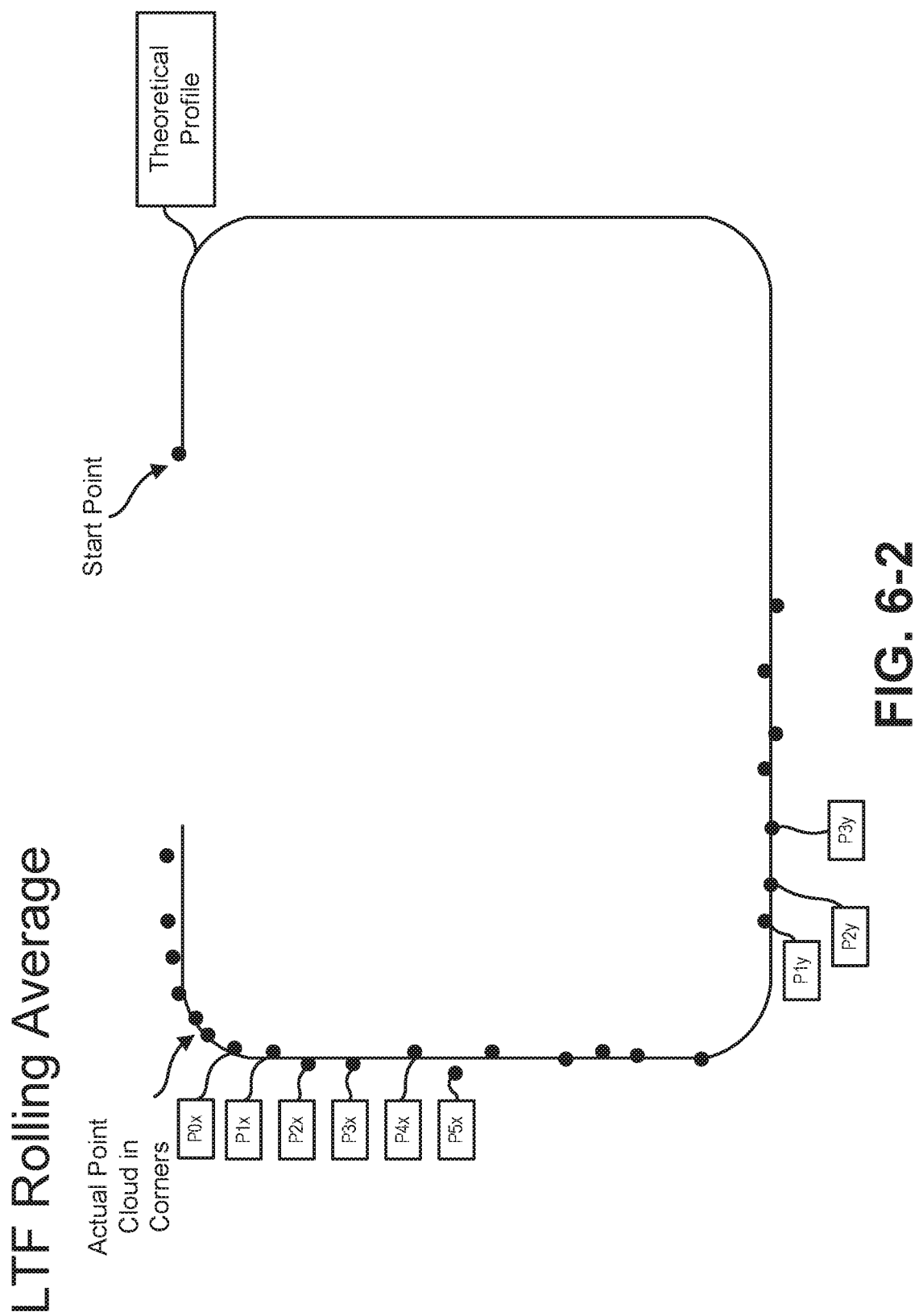

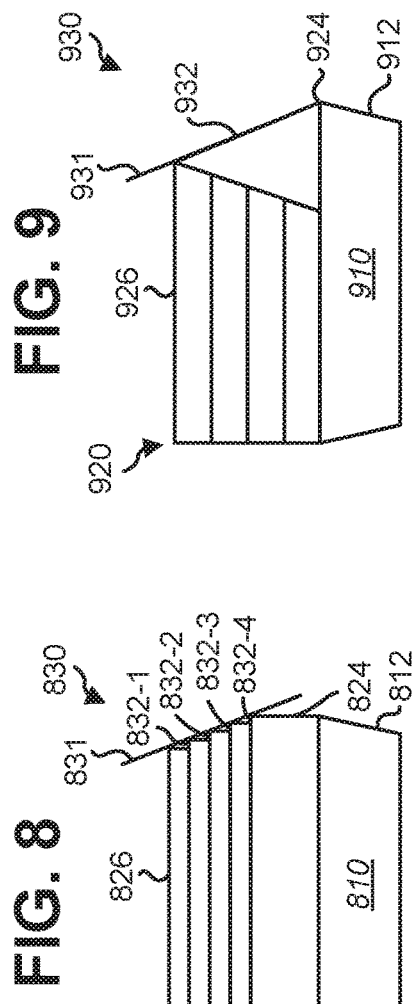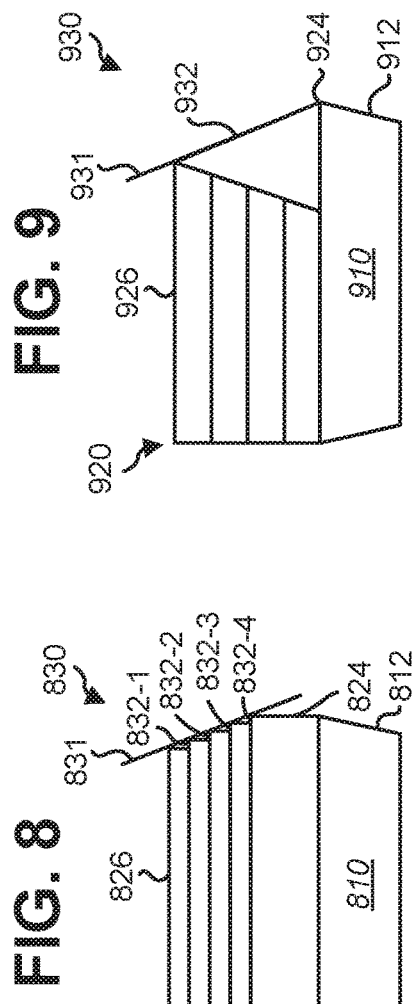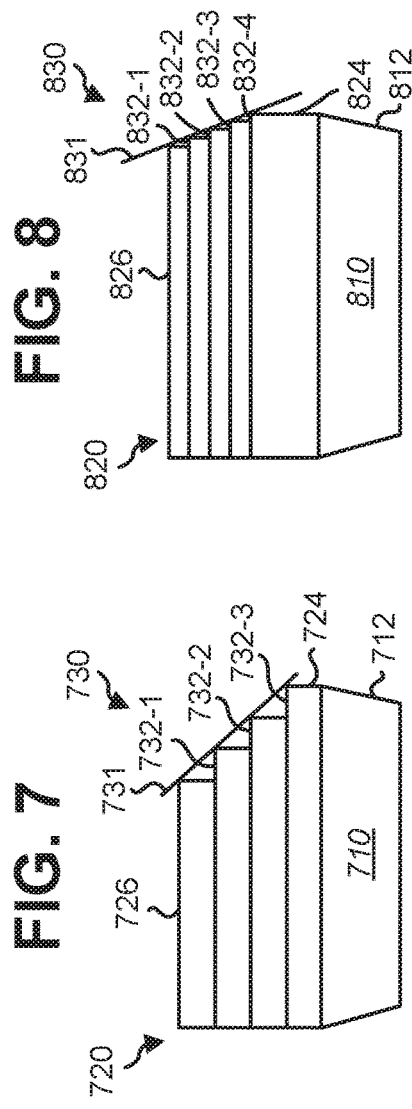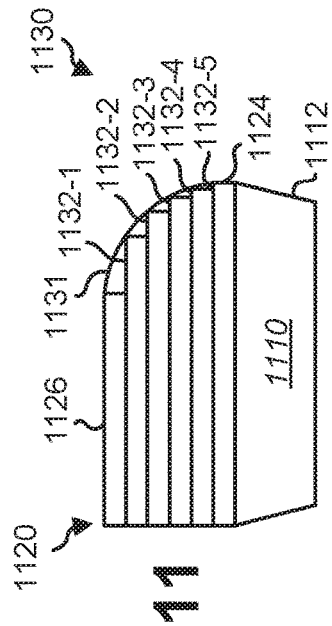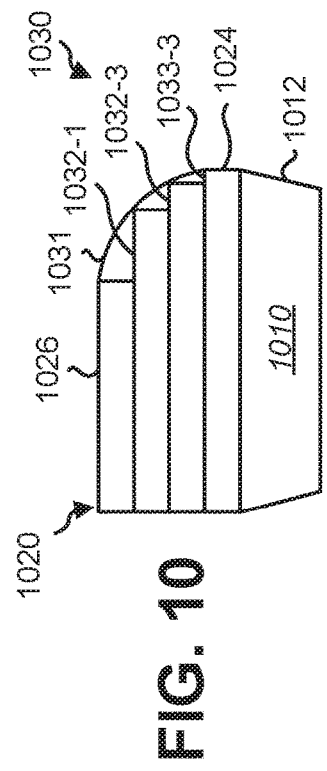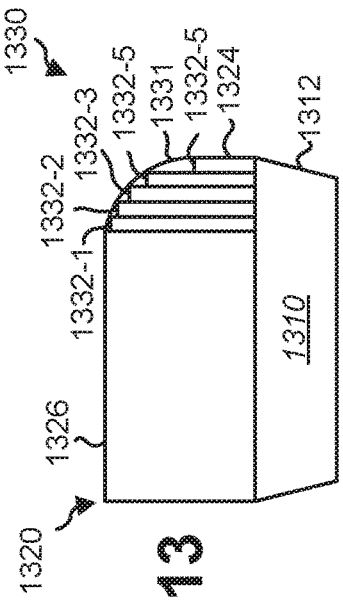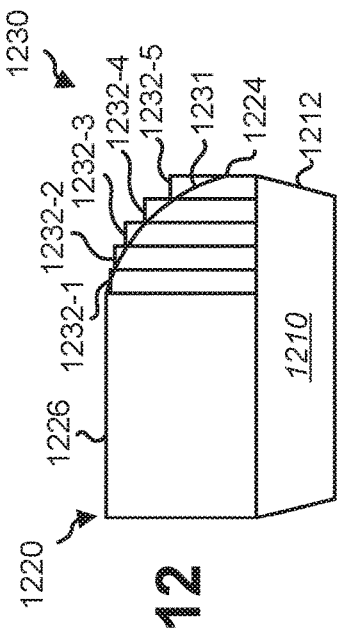

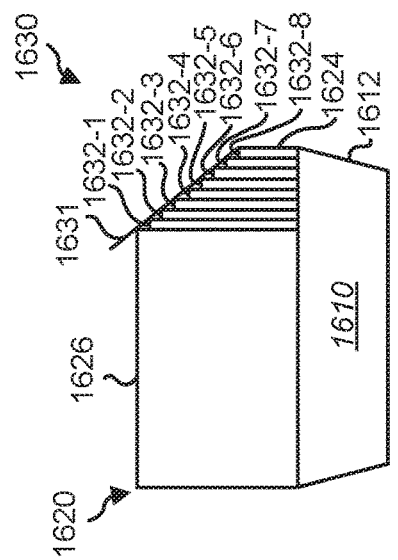
FIG. 14
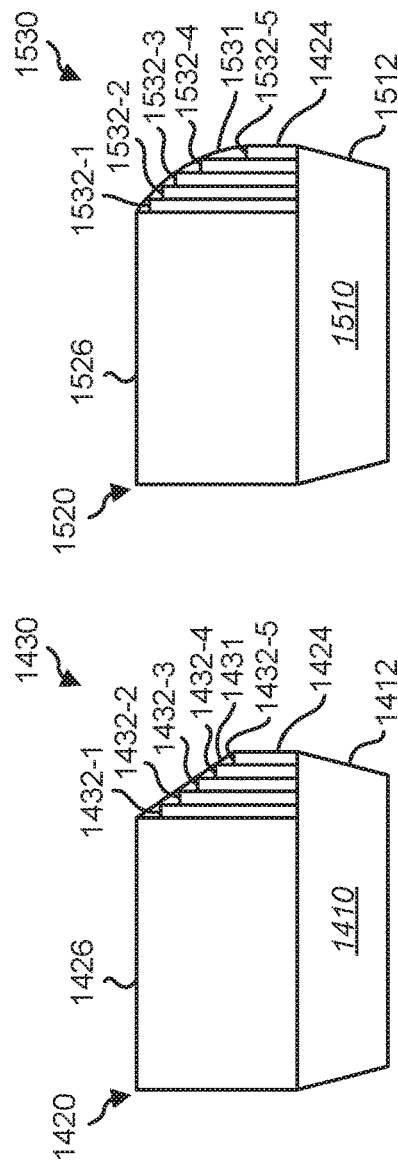
FIG. 15
FIG. 16
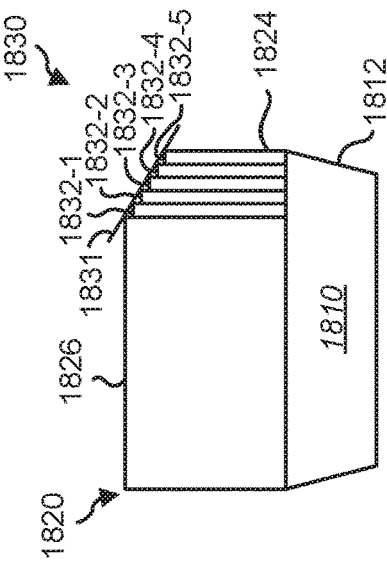
FIG. 17
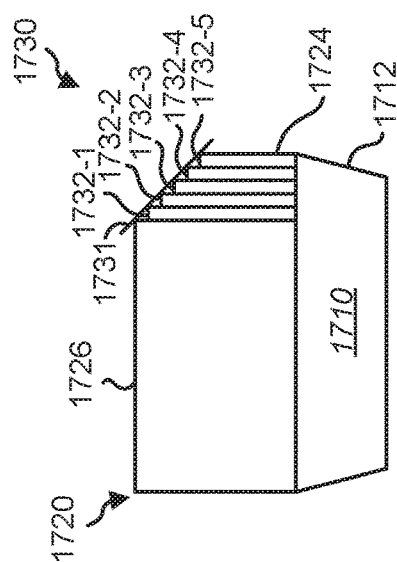
FIG. 18

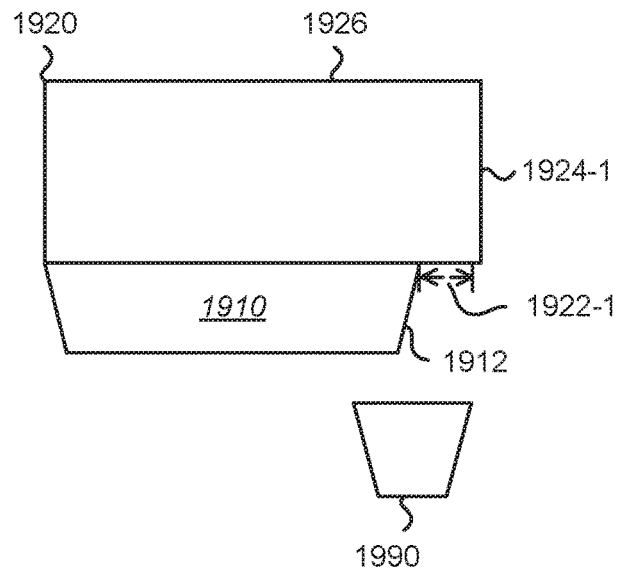
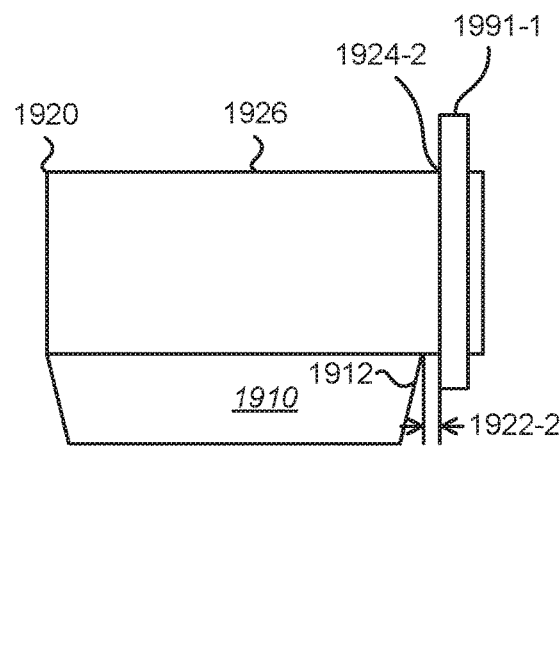
FIG. 19-1
FIG. 19-2
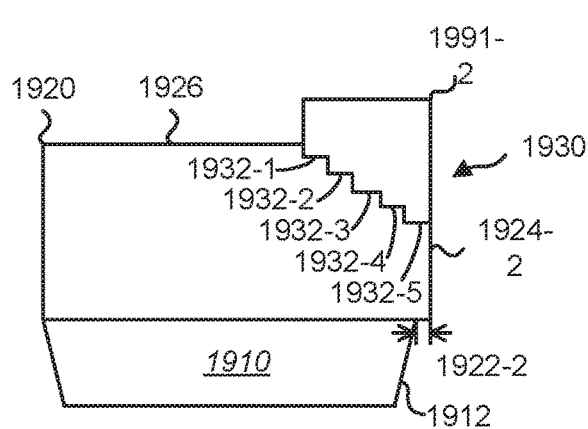
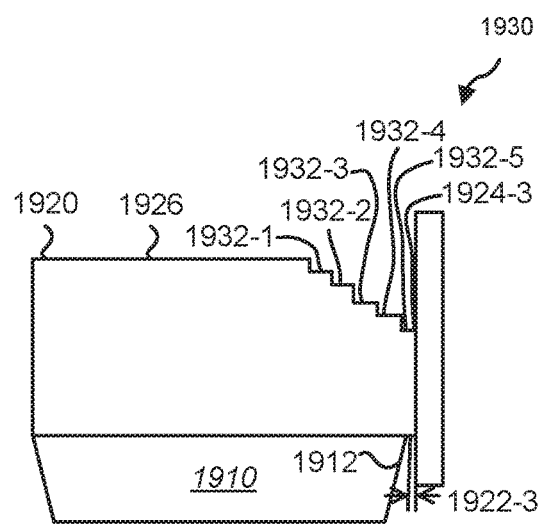
FIG. 19-3
FIG. 19-4

COMPUTING DEVICES WITH FORMED EDGES AND METHODS OF MANUFACTURING THEREOF

CROSS-REFERENCE TO RELATED APPLICATIONS

This application claims the benefit of and priority to U.S. Provisional Patent Application No. 62/492,528, filed on May 1, 2017, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computer. Hybrid computers may act as a tablet computer or a laptop computer. Many hybrid computers include input devices that may be separated from the screen.

The subject matter claimed herein is not limited to example implementations that solve any disadvantages or that operate only in environments such as those described above. Rather, this background is only provided to illustrate one exemplary technology area where some example implementations described herein may be practiced.

BRIEF SUMMARY

In one example implementation, a computing device is described. The computing device includes a support structure having at least one edge. The computing device also includes a cover connected to the support structure. The cover extends to or beyond the at least one edge of the support structure by no more than between 0 and 100 microns over an edge length of at least 100 mm.

In one example implementation, a computing device is described. The computing device includes a fabric cover having a cover edge and a cover surface, the cover edge and/or the cover surface having an edge feature.

In one example implementation, a method of manufacturing a computing device is described. The method includes determining an edge of a computing device. The edge is formed by a support structure of the computing device and a fabric cover connected to the support structure. Based on the edge that was determined, the fabric cover is cut between 0 and 100 microns of the edge of the computing device over an edge length of the computing device of at least 100 mm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific example implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the example implementations will be described and explained with additional specificity and detail through the use of the accompanying drawings in which:

FIGS. 5-1 through 5-3 are side cross-sectional schematic views of an example implementation of a portion of a computing device illustrating an example implementation of a method of manufacturing a computing device;

FIGS. 6-1 through 6-3 are schematic diagrams of an example implementation of a method of manufacturing a computing device;

FIG. 7 is a side cross-sectional schematic view of an example implementation of a portion of a computing device;

FIG. 8 is a side cross-sectional schematic view of an example implementation of a portion of a computing device;

FIG. 9 is a side cross-sectional schematic view of an example implementation of a portion of a computing device;

FIG. 10 is a side cross-sectional schematic view of an example implementation of a portion of a computing device;

FIG. 11 is a side cross-sectional schematic view of an example implementation of a portion of a computing device;

FIG. 12 is a side cross-sectional schematic view of an example implementation of a portion of a computing device;

FIG. 13 is a side cross-sectional schematic view of an example implementation of a portion of a computing device;

FIG. 14 is a side cross-sectional schematic view of an example implementation of a portion of a computing device;

FIG. 15 is a side cross-sectional schematic view of an example implementation of a portion of a computing device;

FIG. 16 is a side cross-sectional schematic view of an example implementation of a portion of a computing device;

FIG. 17 is a side cross-sectional schematic view of an example implementation of a portion of a computing device;

FIG. 18 is a side cross-sectional schematic view of an example implementation of a portion of a computing device; and FIGS. 19-1 through 19-4 are side cross-sectional schematic views of an example implementation of a portion of a computing device illustrating an example implementation of a method of manufacturing a computing device.

DETAILED DESCRIPTION

This disclosure generally relates to computing devices with formed edges and methods of manufacturing thereof.

More particularly, this disclosure generally relates to computing devices with a cover and support structure (e.g., a bucket) with a small gap between a cover edge and an edge of the support structure, computing devices with a fabric cover with a formed edge feature, and methods of manufacturing the same.

Fabrics may be used in manufacturing various components of computing devices. Fabrics may be attached to support structures. In some situations, when a fabric is attached to a support structure at an edge, the fabric may overhang or underhang the edge of the support structure.

Figure 1:
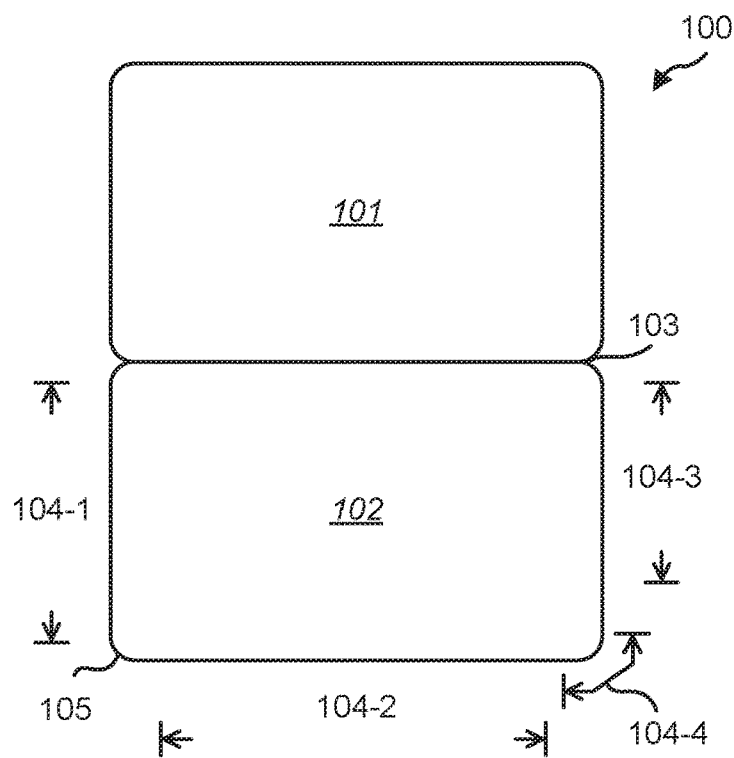
FIG. 1 is a perspective view of an example implementation of a computing device in an open configuration.

FIG. 1 is a perspective view of an example implementation of a computing device 100 in an open configuration. The computing device 100 is shown as a laptop. In other example implementations, the computing device 100 may be a smartphone, a tablet, a watch, a desktop, a game controller, a camera, other computing devices, and accessories therefor. The computing device 100 is shown with a display 101 and an input device 102. The computing device 100 may include a processor, memory, input/output connections, communication devices, other computing components, or combinations thereof. One or more computing components may be found in the display 101 and/or the input device 102.

The computing device 100 is shown with one or more edges 104 having a length. One or more of the edges 104 may form a perimeter 105 of the computing device. The first edge 104-1 extends along the depth of the input device 102, the second edge 104-2 extends along the width of the input device 102, the third edge 104-3 extends along a portion of the depth of the input device 102 along the right side, and the fourth edge 104-4 extends around a corner of the input device 102 between two edges (e.g., edge 104-2 and the right edge of the input device). In other words, edges 104 may be straight, curved, both, or otherwise shaped.

Figure 2:
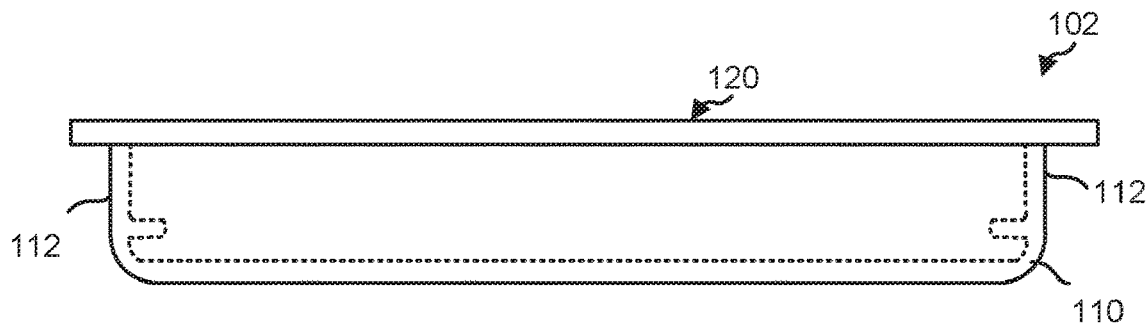
FIG. 2 is a side cross-sectional view of the example implementation of FIG. 1.

FIG. 2 is a side cross-sectional view of the example implementation of an input device 102 of FIG. 1. Although the input device 102 is described, this description may also apply to other components (e.g., the display 101, other input devices, and accessories) of the computing device 100. The computing device 100 may include a support structure 110 (e.g., a bucket). The support structure 110 may have one or more edges 112. A cover 120 may be connected to the support structure 110 at or near the one or more edges 112.

The cover 120 may include a fabric cover, a metallic cover, other cover materials, or combinations thereof. In at least one example implementation, the cover 120 may include Alcantara fabric. The cover 120 may be distinct from the support structure 110. In other words, in at least one example implementation, the cover 120 and the support structure 110 are not integrally formed. For example, the cover 120 may be adhered, affixed, fastened, or otherwise connected to the support structure 110.

Figure 3:
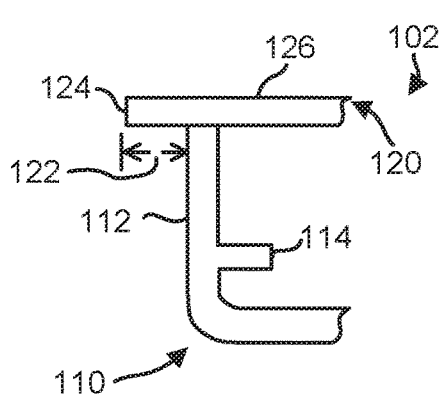
FIG. 3 is a partial cutaway cross-sectional view of the example implementation of FIG. 1.

FIG. 3 is a partial cutaway cross-sectional view of the example implementation of an input device 102 of FIG. 1. As shown the support structure 110 may include a support feature 114. One or more computing components may be connected to one or more support features 114.

The cover 120 may include a cover edge 124 and a cover surface 126. As shown, the cover edge 124 and the cover surface 126 are flat (e.g., straight). In other example implementations, one or more of the cover edge 124 and the cover surface 126 may be curved, stepped, or otherwise shaped. The cover 120 may form a gap 122 between an outermost (e.g., furthest from the support structure 110) point of the cover edge 124 and the edge 112 of the support structure 110. As shown in FIGS. 2 and 3, the edge 112 of the support structure 110 may have a straight vertical portion.

Figure 4:
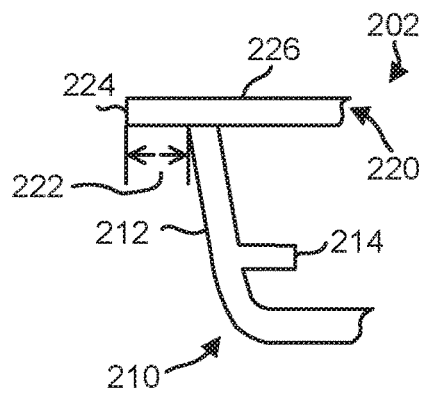
FIG. 4 is a partial cutaway cross-sectional view of another example implementation of a computing device.

FIG. 4 is a partial cutaway cross-sectional view of another example implementation of a computing component of a computing device. As with FIG. 3, the illustrated computing component is an input device 202. The computing component may have a support structure 210 and a cover 220. The support structure 210 may include one or more edges 212 and/or one or more support features 214. The cover 220 may include a cover edge 224 and a cover surface 226. The cover 220 may form a gap 222 between an outermost (e.g., furthest from the support structure 210) point of the cover edge 224 and the edge 212 of the support structure 210. As shown in FIG. 4, the edge 212 of the support structure 210 may have a slanted (e.g., diagonal) portion. In other example implementations, the gap may be measured between the outermost point of the cover edge and the outermost portion of the edge of the support structure.

Figures 1, 5:
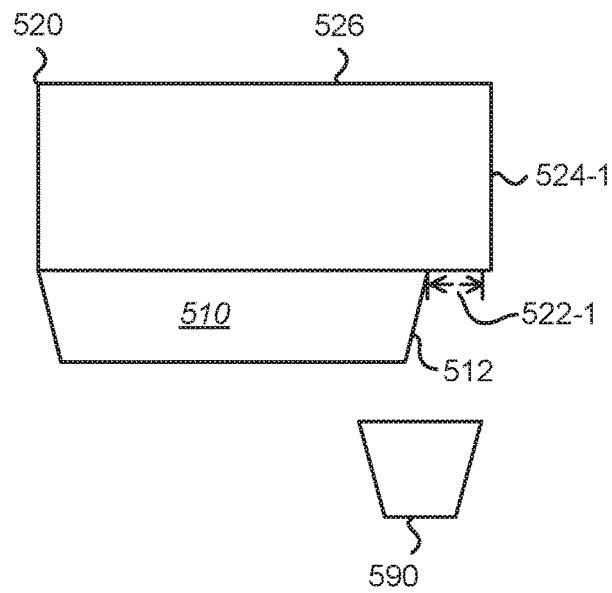
Figures 2, 5:
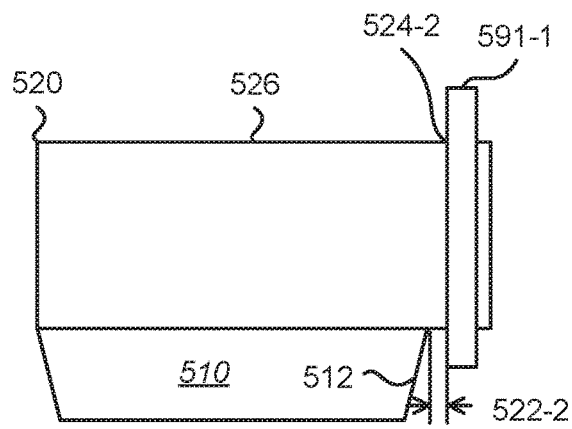
Figures 3, 5:
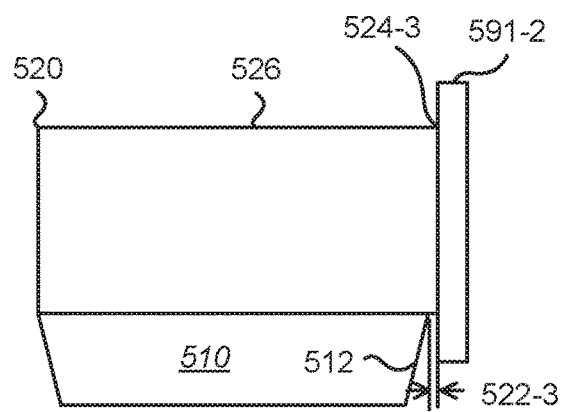

FIGS. 5-1 through 5-3 are side cross-sectional schematic views of an example implementation of a portion of a computing device illustrating an example implementation of a method of manufacturing a computing device. The computing device includes a support structure 510 and a cover 520. The support structure 510 includes one or more edges 512. The cover 520 includes a cover edge 524 and a cover surface 526. The cover 520 forms a gap 522 between the edge 512 of the support structure 510 and the cover edge 524 of the cover 520.

As shown in FIG. 5-1, the gap 522-1 is relatively large. For example, the gap 522-1 may be greater than 100 microns. Although FIG. 5-1 shows a single cross-section, the gap 522-1 may vary along an edge (e.g., edges 104-1, 104-2, 104-3, 104-4). In other words, the cover edge 522 may not be uniform along an edge and/or the edge 512 of the support structure 510 may not be uniform along an edge. For example, the cover 520 may not be perfectly straight. In another example, the support structure 510 may not be perfectly straight due to manufacturing errors, heat warpage, other irregularities, or combinations thereof.

It may be desirable, in at least one example implementation, to cut the cover 520 to approximate the edge 512 of the support structure 510. For example, a large gap 522 may be haptically detectable by the skin of a user. In order to provide a pleasing user experience, it may be desirable to keep the gap 522 below a desired size. For example, it may be desirable to keep the gap 522 below 200 microns, below 150 microns, below 100 microns, below 50 microns, below 20 microns, or below any value therebetween and at least one example implementation having a gap within these ranges is contemplated and may be claimed.

FIG. 5-1 illustrates a method for determining an edge of the computing device where the edge is formed by the support structure 510 and the cover 520 connected to the support structure 510. An edge may be determined by using a measuring device 590. The measuring device 590 may include a high-resolution camera. In at least one example implementation, the measuring device 590 may include a 25-megapixel camera. The measuring device 590 may be capable of determining variations in the edge of the computing device. For example, with a 25 megapixel camera, the measuring device 590 may be capable of recognizing the edge of the computing device to within +/−6 microns As shown in FIG. 5-2, a cutting beam 591-1 (e.g., a laser) may cut through the cover 520 to reduce the gap 522 from the initial gap 522-1 to an intermediate gap 522-2. In other words, the cutting beam 591-1 may change the cover edge 524 from the initial cover edge 524-1 to the intermediate cover edge 524-2. As shown in FIG. 5-3, a cutting beam 591-2, which may be the same or a different cutting beam as the cutting beam 591-1 of FIG. 5-2, may cut through the cover 520 to reduce the gap 522 from the intermediate gap 522-2 to a final gap 522-3. In other words, the cutting beam 591-1 may change the cover edge 524 from the intermediate cover edge 524-2 to the final cover edge 524-3.

The determining of the edge of the computing device accomplished in FIG. 5-1 may be used to guide the cutting beams 591 of FIGS. 5-2 and 5-3. In other words, the determined edge may be used with a numerically controlled cutting beam to cut a desired gap between the edge 512 of the support structure 510 and the cover edge 524. The intermediate gap 522-2 may be a desired offset from the final gap 522-3. For example, the desired offset may be from 5-80 microns. Although, FIGS. 5-2 and 5-3 illustrate two cuts, in other example implementations, more or fewer cuts may be made.

Although FIGS. 5-2 and 5-3 describe cutting the cover 520 with a single pass of the cutting beam 591, in other example implementations, the cutting beam 591 may make multiple passes to cut through the cover 520. For example, the intermediate cut illustrated in FIG. 5-2 may be accomplished with a laser having a power of 150 watts taking two passes to cut through the approximately 1.1 mm thickness of the cover 520. In another example, the final cut illustrated in FIG. 5-3 may be accomplished with a laser having a power of between 120 and 250 watts taking seven passes to cut through the cover 520. The frequency and/or speed of the cutting beam 591 may be selected to balance the speed of cutting with potential overcutting of the cover 520. For example, the frequency may be between 3 and 8 kHz and may have a feed rate of between 100 and 300 mm/s The cutting beams described herein may include a laser having a power of between 10 and 300 watts. The cutting beams may have a beam width of between 20 and 150 microns. In at least one example implementation, the cutting beams may take between 1 and 30 passes to cut through a cover thickness of between 0.025 and 10 mm.

Figures 1, 6:
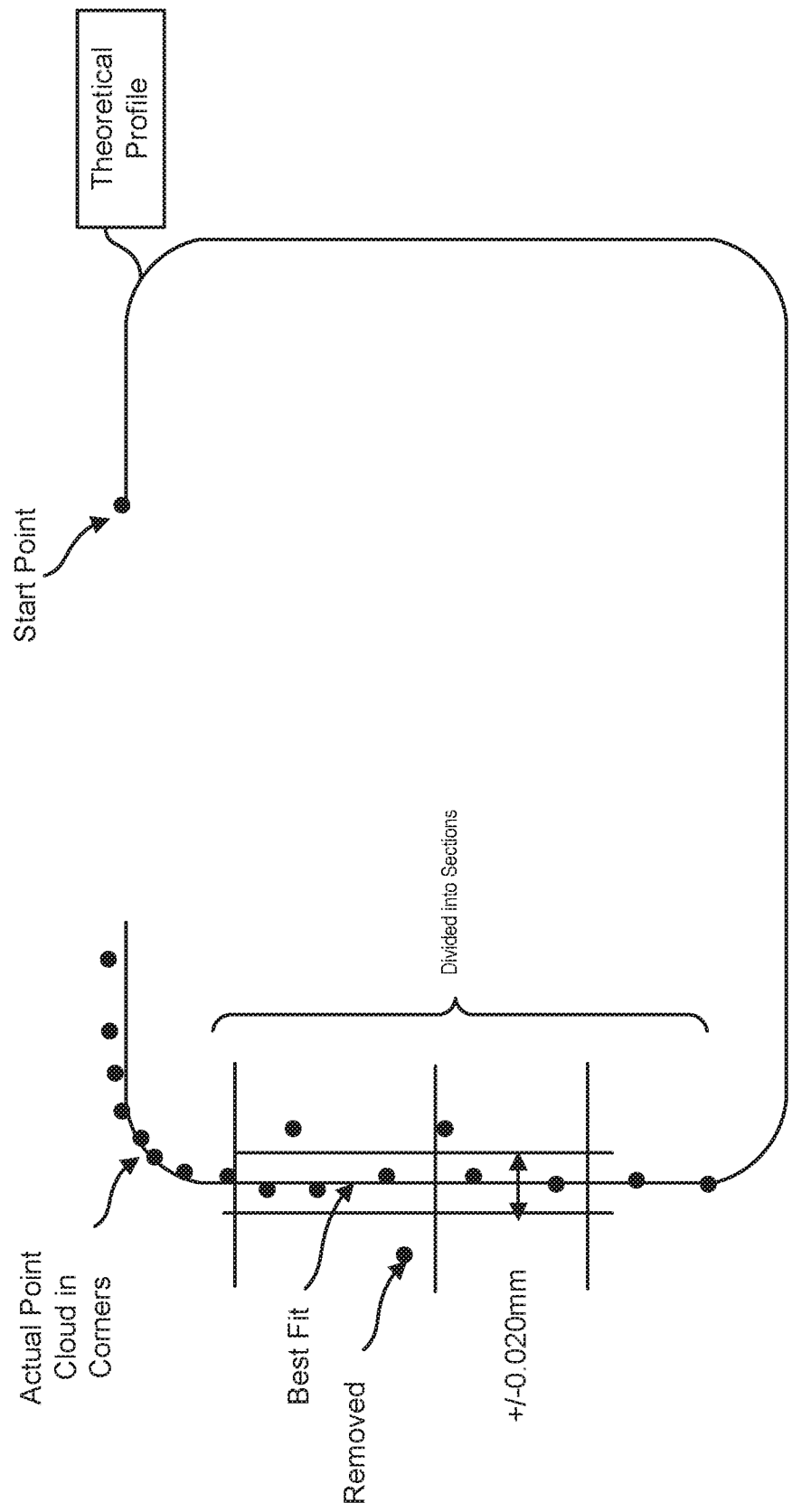
Figures 3, 6:
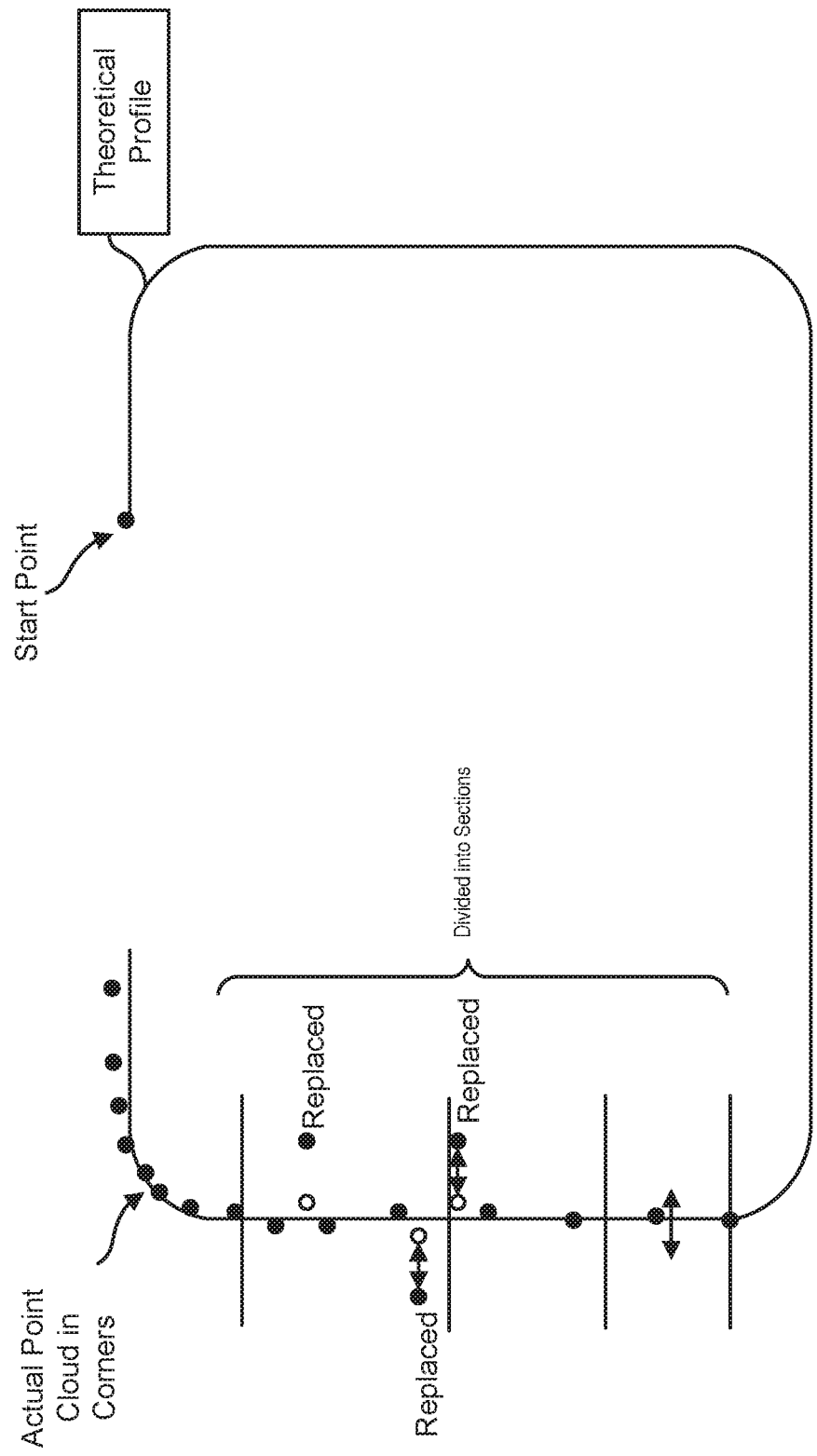

FIGS. 6-1 through 6-3 are schematic diagrams of example implementations of methods of manufacturing a computing device. Although FIGS. 6-1 through 6-3 include text examples of various steps of the method, it will be understood that these text examples may represent only a single example implementation of the method and are not meant to limit the example implementations of the method described in connection with FIGS. 6-1 through 6-3.

FIGS. 6-1 through 6-3 use an example theoretical profile of a computing device. As discussed above, the actual profile of a computing device may vary due to a number of factors including manufacturing defects, warping of materials, other irregularities, or combinations thereof.

FIG. 6-1 illustrates an example implementation of a method of manufacturing a computing device. As shown in FIG. 6-1, a measuring device (e.g., measuring device 590) may be used to determine an edge of the computing device. The edge may be determined by measuring a plurality of points along an edge of the support structure. As shown in FIG. 6-1, the measuring device may measure points along at least a portion of the one or more edges (e.g., edges 104-1, 104-2, 104-3, 104-4, shown in FIG. 1 or other edges). In some example implementations of a method, one or more points may fail to be detected/measured. As shown in FIG. 6-1 multiple images may be taken of the computing device (e.g., 72 images). One or more images may be used to create a point cloud (e.g., a digital representation of the measured points). An example point cloud is provided in FIG. 6-1. The measuring device may attempt to measure/record a point every 1 mm, 900 microns, 800 microns, 700 microns, 600 microns, 500 microns, 400 microns, 300 microns, 200 microns, 100 microns, 50 microns, 10 microns, or any value therebetween.

A best-fit line may be created using one or more points of the point cloud. For example, as shown in FIG. 6-1, a best-fit line may be created between corners of the computing device. The best-fit line in FIG. 6-1 extends from one corner to another. In other example implementations, the best-fit line may extend less than between one corner to another.

The best-fit line may be used to remove points from the point cloud that are beyond a desired distance from the best-fit line. For example, as shown in FIG. 6-1, points that are more than 20 microns away from the best-fit line may be removed. In another example, the desired distance may be between 0 and 150 microns.

The best-fit line may be divided into one or more sections. As shown in FIG. 6-1, the best-fit line has been divided into three sections. Each section may have a maximum number of points that may be removed. For example, as shown in FIG. 6-1, a maximum of five points may be removed per section. Each section may be between 0.05 and 300 mm.

The method of FIG. 6-1 may be similar to a filter (e.g., a combination of a high and low pass filter). For example, the method may remove points that are beyond a desired threshold.

FIG. 6-2 illustrates another example implementation of a method of manufacturing a computing device. FIG. 6-2 may be similar to the example implementation of the method of FIG. 6-1. For example, the method of FIG. 6-2 may determine an edge of a computing device using a measuring device as described in FIG. 6-1. In some example implementations, the method of FIG. 6-2 may be used instead of or in combination with the method of FIG. 6-1.

The method of FIG. 6-2 includes using a rolling average of the plurality of points determined by the measuring device. In other words, multiple points may be averaged together. For example, for a single new point the average distance of one or more points adjacent the initial point may be averaged and used to replace the new point. As shown in FIG. 6-2, for new point P1$x'$ (e.g., the new x-value of the first point), initial points P0$x$ (the original x-value of the 0th point (e.g., the top adjacent point)), P1$x$ (the original x-value of the 1st point (e.g., the desired point)), P2$x$ (the original x-value of the 2nd point (e.g., the bottom adjacent point)) may be added and divided by the total number of points (three). In other example implementations, more or fewer adjacent points may be used. For example, at a corner (e.g., P1$x$) the new value P1$x'$ may be determined by adding P2$x$ (the bottom nearest point), P3$x$ (the next bottom nearest point), PN$x$, etc. divided by N (the number of points used) while a new point more distant from a corner (e.g., P5$x'$) may include adjacent points on both sides (e.g., P5−N$x$ and P5+N$x$) of the original point (e.g., P5$x$), where N is the number of the adjacent point (e.g., P4$x$ being the top nearest point, P3$x$ being the next top nearest point, P6$x$ being the bottom nearest point, and P7$x$ being the next bottom nearest point).

FIG. 6-3 illustrates another example implementation of a method of manufacturing a computing device. FIG. 6-3 may be similar to the example implementations of the method of FIGS. 6-1 and 6-2. For example, the method of FIG. 6-3 may determine an edge of a computing device using a measuring device as described in FIG. 6-1. In some example implementations, the method of FIG. 6-3 may be used instead of or in combination with the method of FIGS. 6-1 and/or 6-2.

The method of FIG. 6-3 includes using a regression rolling average of the plurality of points determined by the measuring device. The regression rolling average is similar to a combination of the filtering of the method of FIG. 6-1 and the rolling average of FIGS. 6-2.

Similar to the method of FIG. 6-1, a best-fit line may be created using one or more points of the point cloud. For example, as shown in FIG. 6-3, a best-fit line may be created between corners of the computing device. The best-fit line in FIG. 6-3 extends from one corner to another. In other example implementations, the best-fit line may extend less than between one corner to another.

Rather than remove points from the point cloud that are beyond a desired distance, the regression rolling average method of FIG. 6-3 may replace points that are beyond a predetermined distance with points based on a rolling average (e.g., the rolling average method of FIG. 6-2).

Similar to the method of FIG. 6-1, the best-fit line may be divided into one or more sections. As shown in FIG. 6-3, the best-fit line has been divided into three sections. Each section may have a maximum number of points that may be replaced. For example, as shown in FIG. 6-3, a maximum of five points may be replaced per section. Each section may be between 0.05 and 300 mm.

As shown in FIG. 6-3, the best-fit line is divided into three sections with a maximum of five points being replaced per section. Each point that is beyond 20 microns from the best-fit line may be replaced with a point that is determined by a rolling average. For example, for a point $P5x$ (the fifth point in the top section of FIG. 6-3), it may be determined that $P5x$ is beyond the predetermined tolerance (e.g., 20 microns), a new point $P5x'$ may be determined by taking a rolling average of one or more adjacent points (e.g., as described in connection with the method of FIG. 6-2).

The methods of FIGS. 6-1 through 6-3 may generate a new set of points that may be used to create a path that may be followed by a cutting beam. This may allow, in at least one example implementation, the cutting beam to cut a cover without cutting, scoring, or otherwise altering the support structure.

FIG. 7 is a side cross-sectional schematic view of an example implementation of a portion of a computing device. The computing device includes a support structure 710 and a cover 720. The support structure 710 includes an edge 712. The cover 720 includes a cover edge 724 and a cover surface 726. The cover 720 may include an edge feature 730. The edge feature 730 may be a chamfer between the cover edge 724 and the cover surface 726.

The edge feature 730 is shown at a single point on the computing device. In other example implementations, the edge feature 730 may extend along the edge 712 of the support structure for a length. For example, the edge feature 730 may extend along at least 100 mm of the edge 712. In another example, the edge feature 730 may extend along a majority (e.g., more than 50%) of the perimeter (e.g., perimeter 105 of FIG. 1) of the computing device. In a further example, the edge feature 730 may extend along an entirety of the edge 712 of the support structure 710. In a still further example, the edge feature 730 may extend along an entirety of four corners (as shown in FIG. 1) and at least three edges (e.g., edges 104). In an even further example, the edge feature 730 may extend along an entirety of the perimeter (e.g., perimeter 105) of the computing device.

The edge feature 730 may vary along at least a portion of, a majority of, or an entirety of at least one of an edge, corner, perimeter, or combinations thereof. In other words, the edge feature 730 may simply be a straight edge feature, such as the edges shown in FIGS. 3 and 4 for a first portion of an edge, corner, perimeter, or combinations thereof and may be a stepped edge feature, as shown in FIGS. 7-10 and 10-18.

The edge feature 730 may include a plurality of steps 732. As shown in FIG. 7, the edge feature 730 may include a first step 732-1, a second step 732-2, and a third step 732-3. The steps 732 may be formed by a material removal process, as described below.

FIGS. 7-18 illustrate various types of edge features. For ease of description, like numbers will be used for like features. For example, the cover 720 may be the same as or similar to the covers 820, 920, 1020, 1120, 1220, 1320, 1420, 1520, 1620, 1720, 1820. Thus components (e.g., edge features, steps, other components) of or features of one or more of the example implementations of computing devices of FIGS. 7-18 may be included in one or more other example implementations of the computing devices of FIGS. 7-18. For example, the edge feature 730 of FIG. 7 may be used for a portion of an edge of a computing device and then may transition to the edge feature 830 of FIG. 8 for another portion of the edge and then may transition to the edge feature 930 of FIG. 9 for a portion of a corner. All combinations and permutations are contemplated and may be claimed. In another example, the width of the first step 1032-1 may be incorporated into the third step 732-3 of the example implementation of the edge feature 730 in FIG. 7.

FIG. 8 is a side cross-sectional schematic view of an example implementation of a portion of a computing device. To simplify description, the differences between the example implementations of FIGS. 7 and 8 will be highlighted. FIG. 8 includes four steps 832, a first, second, third, and fourth step 832-1, 832-2, 832-3, 832-4, respectively. FIGS. 7 and 8 include tangent lines 731, 831, respectively. The tangent lines 731, 831, in FIGS. 7 and 8 contact the cover surface and the edges of each step. The tangent line 731 in FIG. 7 is at a forty-five degree angle with the cover surface 726 and each step 732 is of equal depth dividing the cover 720 evenly. In other words, as shown, the cover 720 is separated into four equal sections. The tangent line 831 in FIG. 8 is at a sixty-degree angle with the cover surface 826 and each step 832 is of equal depth, but does not divide the cover 820 equally. Rather, the fourth step 832-4 defines a section that is thicker (e.g., relative to the support structure 810) than the sections defined by the first, second, and, third steps 832-1, 832-2, 832-3.

FIG. 9 is a side cross-sectional schematic view of an example implementation of a portion of a computing device. To simplify description, some differences between the example implementations of FIGS. 7-8 and 9 will be highlighted. FIG. 9 includes a linear edge feature 930. The linear edge feature 930 includes a step 932 that matches the tangent line 931. The tangent line 931, and therefore the step 932, contacts the cover surface 926 and the cover edge 924. The linear edge feature 930 may be cut by taking multiple passes at small depths of cut and high feed rate. In other words, the step 932 may be formed as an angle, as shown.

FIG. 10 is a side cross-sectional schematic view of an example implementation of a portion of a computing device. To simplify description, some differences between the example implementations of FIGS. 7-8 and 10 will be highlighted. The edge feature 1030 includes three steps 1032-1, 1032-2, 1032-3. The steps 1032 vary in width in the x-direction (e.g., parallel to the cover 1020). The width of the first step 1032-1 is more than double the width of the second step 1032-2. The edge feature 1030 is a rounded edge feature. In other words, the dimensions (e.g., length, width, depth) of the steps 1032 vary along a curve 1031. The curve 1031 is like the tangent lines 731, 831, 931 in FIGS. 7-9 by touching the cover surface 1026, but may differ by intersecting one or more of the steps 1032 not at the edge of the step 1032, but inward (e.g., toward the center of the computing device) from the edge of the step 1032. As shown, the curve 1031 touches the cover surface 1026 at the edge of the cover surface 1026, the first step 1032-1 at the edge of the first step 1032-1, the second step 1032-2 at the edge of the second step 1032-2, the third step 1032-3 inward from the edge of the third step 1032-3, and the bottommost (e.g., nearest the support structure 1010) edge of the cover edge 1024. Although the edge feature 1030 is shown as dividing the cover 1020 into equal sections (e.g., thicknesses), the steps 1032 may vary in width and/or depth as described herein.

FIG. 11 is a side cross-sectional schematic view of an example implementation of a portion of a computing device. To simplify description, some similarities and some differences between the example implementations of FIGS. 10 and 11 will be highlighted. The edge feature 1130 includes five steps 1132-1, 1132-2, 1132-3, 1132-4, 1132-5. Like the steps 1032 in FIG. 10, the steps 1132 vary in width in the x-direction (e.g., parallel to the cover 1120). The width of the first step 1132-1 is more than double the width of the second step 1132-2. The edge feature 1130 is a rounded edge feature. In other words, the dimensions (e.g., length, width, depth) of the steps 1132 vary along a curve 1131. The curve 1131 is like the curve 1031 of FIG. 10 and the tangent lines 731, 831, 931 in FIGS. 7-9 by touching the cover surface 1126, but may differ by intersecting the fifth step 1132-5 not at the edge of the step 1132, but inward (e.g., toward the center of the computing device) from the edge of the fifth step 1132-5. As shown, the curve 1131 touches the cover surface 1126 at the edge of the cover surface 1126, the first step 1132-1 at the edge of the first step 1132-1, the second step 1132-2 at the edge of the second step 1132-2, the third step 1132-3 at the edge of the third step 1132-3, the fourth step 1132-4 at the edge of the fourth step 1132-4, and the fifth step 1132-5 inward from the edge of the third step 1132-3, and the bottommost (e.g., nearest the support structure 1110) edge of the cover edge 1124.

FIG. 12 is a side cross-sectional schematic view of an example implementation of a portion of a computing device. To simplify description, some similarities and some differences between the example implementations of FIGS. 10-11 and 12 will be highlighted. The edge feature 1230 includes five steps 1232-1, 1232-2, 1232-3, 1232-4, 1232-5. Like the steps 1132 in FIG. 11, the steps 1232 vary in dimension. However, the steps 1232 vary in the z-direction (e.g., perpendicular to the cover 1220) rather than the x-direction. The depth of the fifth step 1232-5 is more than double the depth of the fourth step 1232-4. The edge feature 1230 is a rounded edge feature. In other words, the dimensions (e.g., length, width, depth) of the steps 1232 vary along a curve 1231. The curve 1231 is like the curves 1031, 1131 of FIGS. 10-11, but may differ by intersecting multiple steps 1232. As shown, the curve 1231 touches the cover surface 1226 at the edge of the cover surface 1226, the first step 1232-1 at the edge of the first step 1232-1, the second step 1232-2 at an inner (e.g., toward the center of the cover) edge of the second step 1232-2, the third step 1232-3 at an inner edge of the third step 1232-3, the fourth step 1232-4 at an inner edge of the fourth step 1232-4, the fifth step 1232-5 at an inner edge of the fifth step 1232-5, and the bottommost (e.g., nearest the support structure 1210) edge of the cover edge 1224.

FIG. 13 is a side cross-sectional schematic view of an example implementation of a portion of a computing device. To simplify description, some similarities and some differences between the example implementation of FIGS. 12 and 13 will be highlighted. Like the steps 1232 in FIG. 12, the steps 1332 vary in dimension. The computing device of FIG. 13 has five steps 1332, as does the computing device of FIG. 12. However, the widths of the steps 1332 are smaller than the widths of the steps 1232 in FIG. 12. The curve 1331 is like the curves 1031, 1131, 1231 of FIGS. 10-12, but may differ by intersecting only edges of the steps 1332. As shown, the curve 1331 touches the cover surface 1326 at the edge of the cover surface 1326, the first step 1332-1 at the edge of the first step 1332-1, the second step 1332-2 at the edge of the second step 1332-2, the third step 1332-3 at the edge of the third step 1332-3, the fourth step 1332-4 at the edge of the fourth step 1332-4, the fifth step 1332-5 at the edge of the fifth step 1332-5, and the bottommost (e.g., nearest the support structure 1310) edge of the cover edge 1324.

FIGS. 14-15 are side cross-sectional schematic views of example implementations of a portion of a computing device with edge features 1430, 1530 that are 400 microns wide and 700 microns deep. The edge feature 1430 of FIG. 14 has five steps 1432 with equal widths and depths. However, the fifth step 1432-5 defines a section that is thicker (e.g., relative to the support structure 1410) than the sections defined by the other steps 1432. The tangent line 1431 forms an angle of 60 degrees with the cover surface 1426. The edge feature 1530 of FIG. 15 has five steps 1532 with equal widths but varying depths and a radius.

FIG. 16 is a side cross-sectional schematic view of an example implementation of a portion of a computing device. To simplify description, some similarities and some differences between the example implementation of FIGS. 14 and 16 will be highlighted. The edge feature 1630 includes eight steps 1632 with equal widths and depths. The tangent line 1631 has forms an angle of 60 degrees with the cover surface 1626.

FIG. 17 is a side cross-sectional schematic view of an example implementation of a portion of a computing device. To simplify description, some similarities and some differences between the example implementation of FIGS. 14 and 17 will be highlighted. The edge feature 1730 is 500 microns wide and 500 microns deep and includes five steps 1732 with equal widths and depths. The tangent line 1731 forms an angle of 45 degrees with the cover surface 1726.

FIG. 18 is a side cross-sectional schematic view of an example implementation of a portion of a computing device. To simplify description, some similarities and some differences between the example implementation of FIGS. 14 and 18 will be highlighted. The edge feature 1830 is 500 microns wide and 250 microns deep and includes five steps 1832 with equal widths and depths. The tangent line 1831 forms an angle of 30 degrees with the cover surface 1726.

FIGS. 19-1 through 19-4 are side cross-sectional schematic views of an example implementation of a portion of a computing device illustrating an example implementation of a method of manufacturing a computing device. As shown in FIG. 19-1, the gap 1922-1 is relatively large. For example, the gap 1922-1 may be greater than 200 microns. Although FIG. 5-1 shows a single cross section, the gap 1922-1 may vary along an edge (e.g., edges 104-1, 104-2, 104-3, 104-4). In other words, the cover edge 1922 may not be uniform along an edge and/or the edge 1912 of the support structure 1910 may not be uniform along an edge. For example, the cover 1920 may not be perfectly straight. In another example, the support structure 1910 may not be perfectly straight due to manufacturing errors, heat warpage, other irregularities, or combinations thereof.

It may be desirable, in at least one example implementation, to cut the cover 1920 to approximate the edge 1912 of the support structure 1910. For example, a large gap 1922 may be detectable by the skin of a user. In order to provide a pleasing user experience, it may be desirable to keep the gap 1922 below a desired size. For example, it may be desirable to keep the gap 1922 below 200 microns, below 150 microns, below 100 microns, below 190 microns, below 20 microns, or below any value therebetween and at least one example implementation having a gap within these ranges is contemplated and may be claimed.

FIG. 19-1 illustrates a method for determining an edge of the computing device where the edge is formed by the support structure 1910 and the cover 1920 connected to the support structure. An edge may be determined by using a measuring device 1990. The measuring device 1990 may include a high-resolution camera. In at least one example implementation, the measuring device 1990 may include a 25-megapixel camera. The measuring device 1990 may be capable of determining variations in the edge of the computing device. For example, with a 25 megapixel camera, the measuring device 1990 may be capable of recognizing the edge of the computing device to within +/−6 microns.

As shown in FIG. 19-2, a cutting beam 1991-1 (e.g., a laser) may cut through the cover 1920 to reduce the gap 1922 from the initial gap 1922-1 and the intermediate gap 1922-2. In other words, the cutting beam 1991-1 may change the cover edge 1924 from the initial cover edge 1924-1 to the intermediate cover edge 1924-2.

As shown in FIG. 19-3, a second cutting beam 1991-2 (or plurality of cutting beams) may form an edge feature 1930. The edge feature 1930 shown is a five step 1932 straight edge feature. However, the method shown in FIG. 19-3 may be used to shape any example implementation disclosed herein and permutations thereof.

As shown in FIG. 19-4, a cutting beam 1991-3, which may be the same or a different cutting beam as the cutting beams 1991-1, 1991-2 of FIGS. 19-2 and 19-3, may cut through the cover 1920 to reduce the gap 1922 from the intermediate gap 1922-2 to a final gap 1922-3. In other words, the cutting beam 1991-1 may change the cover edge 1924 from the intermediate cover edge 1924-2 to the final cover edge 1924-3.

The determining of the edge of the computing device accomplished in FIG. 19-1 may be used to guide the cutting beams 1991 of FIGS. 19-2 and 19-3. In other words, the determined edge may be used with a numerically controlled cutting beam to cut a desired gap between the edge 1912 of the support structure 1910 and the cover edge 1924. The intermediate gap 1922-2 may be a desired offset from the final gap 1922-3. For example, the desired offset may be from 5-80 microns. Although, FIGS. 19-2 and 19-3 illustrate two cuts, in other example implementations, more or fewer cuts may be made.

Although FIGS. 19-2 and 19-4 describe cutting the cover 1920 with a single pass of the cutting beam 1991, in other example implementations, the cutting beam 1991 may make multiple passes to cut through the cover 1920. For example, the intermediate cut illustrated in FIG. 19-2 may be accomplished with a laser having a power of 150 watts taking two passes to cut through the approximately 1.1 mm thickness of the cover 1920. In another example, the final cut illustrated in FIG. 19-3 may be accomplished with a laser having a power of between 120 and 250 watts taking seven passes to cut through the cover 1920. The frequency and/or speed of the cutting beam 1991 may be selected to balance the speed of cutting with potential overcutting of the cover 1920. For example, the frequency may be between 3 and 8 kHz and may have a feed rate of between 100 and 300 mm/s.

The cutting beams described herein may include a laser having a power of between 10 and 300 watts. The cutting beams may have a beam width of between 20 and 150 microns. The cutting beams may take between 1 and 30 passes to cut through a cover thickness of between 0.025 and 10 mm.

In at least one example implementation described herein, a computing device may manufactured by one or more example implementations of a method described herein. For example, the computing device may be a product by process. However, a computing device produced by one or more of the methods herein may be cut while the cover is connected to the support structure. Thus, it is contemplated that at least one example implementation of a computing device described herein will include variations along the edge of the support structure of between 0.025 and 0.8 mm along a length of 1000 mm.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one example implementation" or "an example implementation" of the present disclosure are not intended to be interpreted as excluding the existence of additional example implementations that also incorporate the recited features. For example, any element described in relation to an example implementation herein may be combinable with any element of any other example implementation described herein. Numbers, percentages, ratios, or other values stated herein are intended to include that value, and also other values that are "about" or "approximately" the stated value, as would be appreciated by one of ordinary skill in the art encompassed by example implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to example implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the example implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described example implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
a display and a support structure; the support structure comprising: an input device connected to the display;
the support structure further comprising:
a first edge, a second edge, and a third edge; and
a cover permanently adhered to the support structure at the first edge, the second edge, and the third edge, the cover extends to or beyond the first edge of the support structure forming a gap of no more than 100 microns but greater than 0 microns over a length of the first edge of at least 100 mm,
wherein the cover has a cover edge and a cover surface, at least one of the cover edge and the cover surface having an edge feature; wherein the edge feature extends along an entirety of the edge of the computing device, by no more than 400 microns wide and 700 microns deep; wherein the edge feature further including a plurality of steps, the plurality of steps including at least three steps and forms an angle tangential relative to the plurality of steps; at least one of the steps having a depth no less than 70 microns; the edge feature further including a chamfer defining a radius between the cover edge and the cover surface.

2. A method of manufacturing a computing device, comprising:
determining a first edge and a second edge of a computing device, the first edge and the second edge formed by a support structure of the computing device and a cover connected to the support structure;
based on the first edge that was determined, cutting the cover between 0 and 100 microns of the first edge of the computing device over an edge length of the computing device of at least 100 mm; and
based on the second edge that was determined, cutting the cover between 0 and 100 microns of the second edge of the computing device over an edge length of the computing device of at least 100 mm.

3. The method of claim 2, wherein the further comprising after cutting the cover between 0 and 100 microns of the first edge, applying a surface treatment to the support structure.

4. The method of claim 2, wherein the cover is a synthetic microfiber fabric.

5. The method of claim 2, further comprising a display connected to the support structure, and wherein the support structure is an input device connected to the display.

6. A computing device, comprising: a display; an input device connected to the display, the input device including:
a support structure having a first edge, a second edge, a third edge, and plurality of support features; and an ALCANTARA fabric cover affixed to the support structure at the first edge, the second edge, and the third edge, the cover extends to or beyond the first edge of the support structure by no more than 100 microns but greater than 0 microns over a length of the first edge of at least 100 mm, the cover extends to or beyond the second edge of the support structure by no more than 100 microns but greater than 0 microns over a length of the second edge of at least 100 mm, and the cover extends to or beyond the third edge of the support structure by no more than 100 microns but greater than 0 microns over a length of the third edge of at least 100 mm;
a processor in communication with the display and the input device, the processor affixed to a first support feature of the plurality of support features of the support structure; and memory in communication with the processor, the memory affixed to a second support feature of the plurality of support features of the support structure.

7. The computing device of claim 6, wherein the length of the first edge is at least 300 mm and wherein the cover extends beyond the first edge of the support structure by a gap of no more than between 0 and 75 microns over the 300 mm length of the first edge.

8. The computing device of claim 2, wherein the cover has a cover edge and a cover surface, the cover edge and/or the cover surface having an edge feature.

9. The computing device of claim 8, wherein the edge feature includes a chamfer between the cover edge and the cover surface.

10. The computing device of claim 8, wherein the edge feature extends along a length of at least 300 mm.

11. The computing device of claim 8, wherein the edge feature extends along a majority of a perimeter of the computing device.

12. The computing device of claim 8, wherein the edge feature extends along an entirety of the edge of the computing device.

13. The computing device of claim 8, wherein the edge feature is nonlinear.

14. The computing device of claim 8, wherein the edge feature is tapered.

15. The computing device of claim 8, wherein the edge feature includes a plurality of steps.

16. The computing device of claim 15, wherein the plurality of steps form an angle tangential to the plurality of steps.

17. The computing device of claim 15, wherein the plurality of steps includes at least three steps.

18. The computing device of claim 15, wherein at least one of the plurality of steps includes a step with a depth of at least 70 microns.

19. The computing device of claim 8, wherein the edge feature includes a chamfer between the cover edge and the cover surface.

20. The computing device of claim 19, wherein the chamfer defines a radius between 0.35 mm and 0.6 mm.

* * * * *

UNITED STATES PATENT AND TRADEMARK OFFICE
CERTIFICATE OF CORRECTION

PATENT NO. : 10,890,954 B2
APPLICATION NO. : 15/691475
DATED : January 12, 2021
INVENTOR(S) : Ryan Travis Evans et al.

It is certified that error appears in the above-identified patent and that said Letters Patent is hereby corrected as shown below:

In the Specification

Column 3
Line 47 change "Alcantara fabric" to --ALCANTARA® fabric--

Signed and Sealed this
Twelfth Day of July, 2022

Katherine Kelly Vidal
*Director of the United States Patent and Trademark Office*